United States Patent
Pandey et al.

(10) Patent No.: US 11,276,418 B2
(45) Date of Patent: Mar. 15, 2022

(54) ACOUSTIC SIGNATURE GENERATION BY EMBEDDING USER SENTIMENTS

(71) Applicant: INTERNATIONAL BUSINESS MACHINES CORPORATION, Armonk, NY (US)

(72) Inventors: Diwesh Pandey, Bangalore (IN); Arun Joseph, Bangalore (IN); Shiladitya Ghosh, Bangalore (IN); Shashidhar Reddy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 16/568,572

(22) Filed: Sep. 12, 2019

(65) Prior Publication Data

US 2021/0082454 A1 Mar. 18, 2021

(51) Int. Cl.
*G10L 25/48* (2013.01)
*G06F 3/01* (2006.01)

(52) U.S. Cl.
CPC .............. *G10L 25/48* (2013.01); *G06F 3/011* (2013.01)

(58) Field of Classification Search
CPC .......... G10L 25/48; G06F 3/011; G06F 40/30; G06F 2203/011; G06F 3/01
See application file for complete search history.

(56) References Cited

U.S. PATENT DOCUMENTS

| 8,775,013 | B1 | 7/2014 | Smailus et al. | |
| 2015/0277540 | A1* | 10/2015 | Jackson | G06F 3/03547 345/169 |
| 2016/0150333 | A1 | 5/2016 | Goldstein et al. | |
| 2017/0110123 | A1 | 4/2017 | Sharifi et al. | |
| 2017/0278518 | A1 | 9/2017 | Kashtan et al. | |
| 2018/0144040 | A1 | 5/2018 | Vlack et al. | |
| 2020/0193264 | A1* | 6/2020 | Zavesky | G06N 20/00 |
| 2021/0141453 | A1* | 5/2021 | Miller, III | A61B 5/369 |

OTHER PUBLICATIONS

Govindaraj, et al., "Intensified Sentiment Analysis of Customer Product Reviews Using Acoustic and Textual Features," ETRI Journal, vol. 38, No. 3, Jun. 2016, pp. 494-501, 8p.
Mell, et al., "The NIST Definition of Cloud Computing," NIST Special Publication 800-145, Sep. 2011, 7p.

* cited by examiner

*Primary Examiner* — Huyen X Vo
(74) *Attorney, Agent, or Firm* — Cantor Colburn LLP; Kelsey Skodje (57) ABSTRACT

Aspects of the invention include acoustic signature generation via user sentiment embedding. An example method includes an audio signal of user speech, obtaining a user context and a user state space for at least one user, generating a sentiment vector from the user context and the user state space, generating a set of sentiment signals for based on the sentiment vector, and embedding the audio signal with the set of sentiment signals to generate an embedded sentiment signal.

20 Claims, 7 Drawing Sheets

ACOUSTIC SIGNATURE GENERATION BY EMBEDDING USER SENTIMENTS

BACKGROUND

The present invention generally relates to fingerprint generation, and more specifically, to acoustic signature generation via user sentiment embedding.

Acoustic signatures are used in creating fingerprints (i.e., audio signatures) from a unique set of voices or audio. Some systems generate these fingerprints based exclusively on a person's voice characteristic.

SUMMARY

Embodiments of the present invention provide a computer-implemented method for acoustic signature generation via user sentiment embedding. A non-limiting example computer-implemented method includes receiving, by a system comprising one or more processors, an audio signal of user speech. The method includes obtaining, by the system, a user context for at least one user. The method includes obtaining, by the system, a user state space for the at least one user. The method includes generating, by the system, a sentiment vector from the obtained user context and the obtained user state space. The method includes generating, a set of sentiment signals for the at least one user based on the sentiment vector. The method includes embedding the audio signal with the set of sentiment signals to generate an embedded sentiment signal. The method includes generating the acoustic signature by converting the embedded sentiment signal into a frequency domain.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide an audio fingerprinting technique, which considers a person's context from all possible aspects along with different available state spaces. For example, in some embodiments of the present invention, the technique includes receiving speech of a user or group of users, obtaining user context and user state space for a user or group of users, and generating a set of multiple signals representing sentiment of a user or group of users The set of signals are combined to generate an overall embedded sentiment signal, which is converted into the frequency domain.

As noted above, some known system utilize acoustic signatures to create fingerprints of unique set of voices or audio. Those system employ methodologies that have various technical problems. For example, as the generation of fingerprints under those systems are based exclusively on a person's voice characteristic, the fingerprints that are generated are insufficient because those system do not take into consideration nor identify an overall context of a person or group of people as the generation of the fingerprints are based exclusively on a person's voice characteristic. For example, those systems are unable to capture a person's behavior/context changes based on presence of the companion or other persons in the vicinity, a topic of the conversation, nor a location within a state space.

Figure 1:
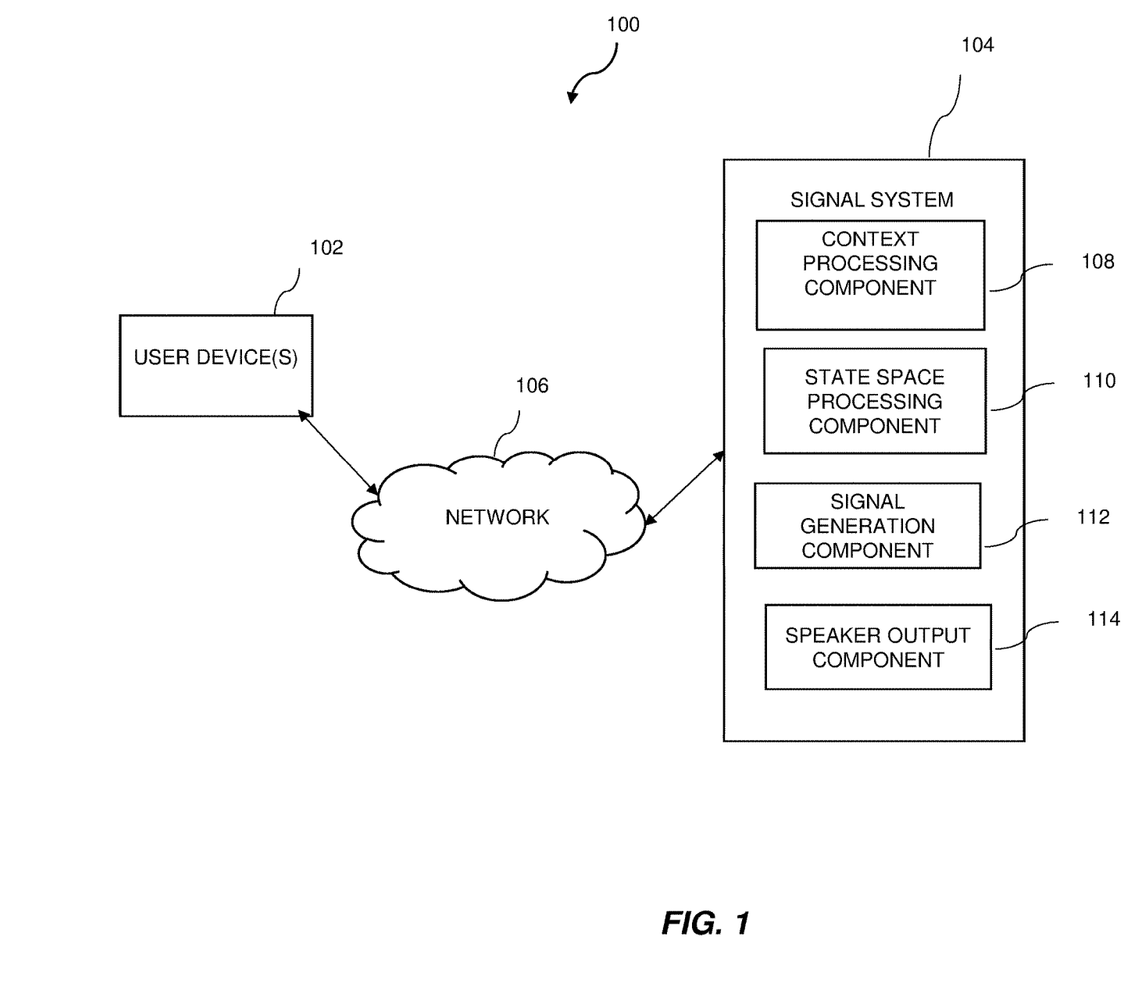
FIG. 1 depicts a block diagram of an example distributed environment in accordance with one or more embodiments of the present invention.

Turning now to FIG. 1, an example distributed environment 100 is presented for acoustic signature generation via user sentiment embedding. Distributed environment 100 includes one or more user devices 102 and a signal system 104, which are interconnected via network 106. FIG. 1 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

Signal system 104 includes a context processing component 108, a state space processing component 110, a signal generation component 112, and/or a speaker output component 114. In some embodiments of the present invention, context processing component 108, state space processing component 110, signal generation component 112, and/or speaker output component 114 are interconnected via a communication infrastructure and/or communication path such as the one shown in FIG. 7. Signal system 104 may have internal and external hardware components, such as those depicted and described below with respect to FIG. 7.

Figure 5:
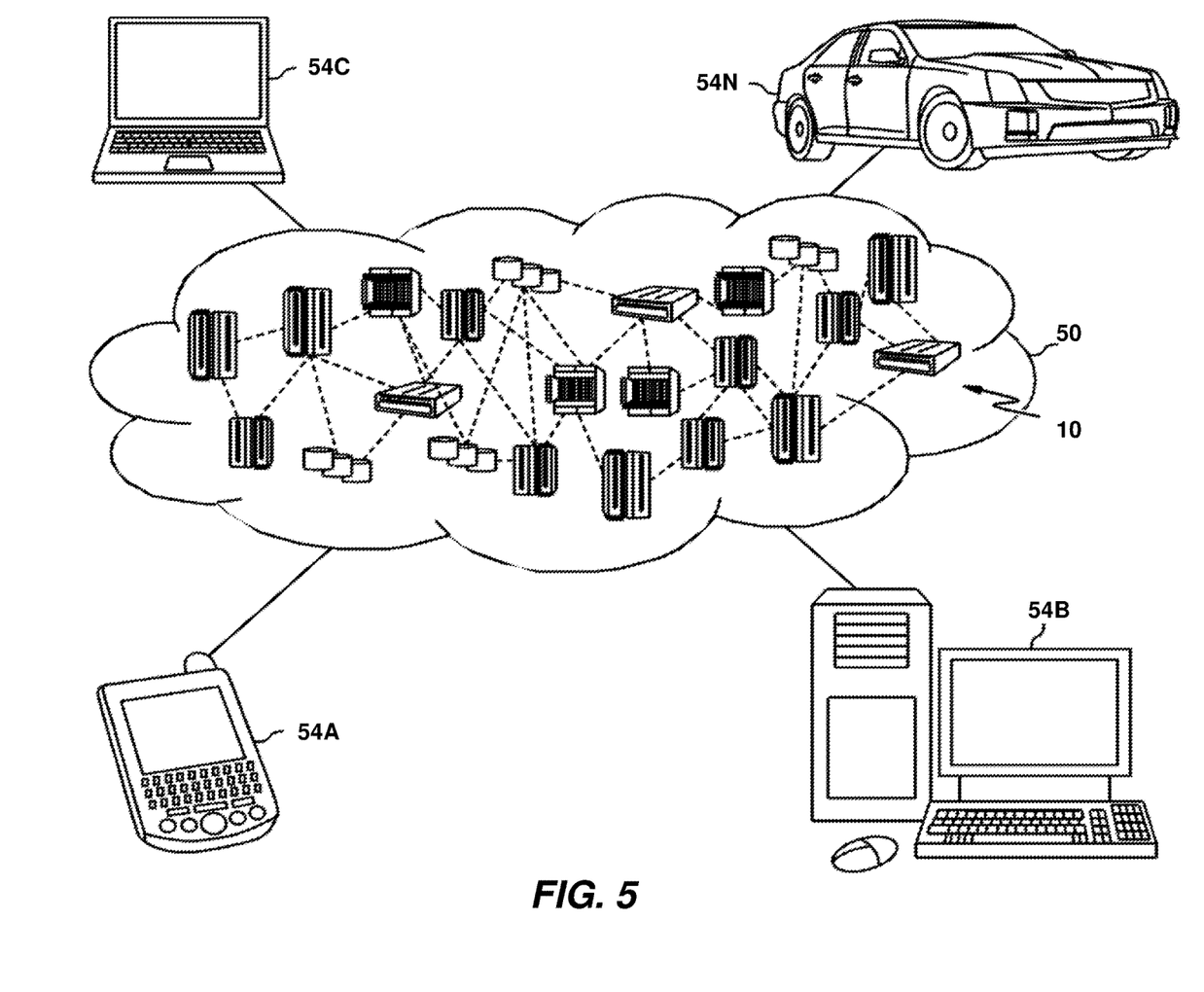
FIG. 5 depicts a cloud computing environment according to one or more embodiments of the present invention.

In some embodiments of the present invention, signal system 104 is a standalone computing device, a management server, a web server, a mobile computing device, or other suitable electronic device and/or computing system capable of receiving, sending, and processing data. In some embodiments of the present invention, signal system 104 is a server computing system utilizing multiple computers, such as in cloud computing environment 50 (FIG. 5). In some embodiments of the present invention, signal system 104 is a laptop computer, a tablet computer, a netbook computer, a personal computer (PC), a desktop computer, a personal digital assistant (PDA), a smart phone, or other suitable programmable electronic device capable of communicating with user device 102 and other computing devices (not shown) within distributed environment 100 via network 106. In some embodiments of the present invention, signal system 104 is a computing system utilizing clustered computers and components (e.g., database server computers, application server computers, etc.) that act as a single pool of seamless resources that are accessible within distributed environment 100. In some embodiments of the present invention, signal generation component 112 of signal system 104 includes or is connected to one or more signal generation engines that are capable of generating acoustic and embedded sentiment signals, which may be outputted or converted into the frequency domain (e.g., audible signals). In some embodiments of the present invention, speaker output component 114 includes or is connected to one or more speakers that are configured to output an audio signal. Signal system 104 may have internal and external hardware components, such as those depicted and described below with respect to FIG. 7.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any suitable combination of connections and protocols that can support communications between user device 102 and signal system 104, and/or other computing devices (not shown) within a distributed environment 100. In some embodiments of the present invention, distributed environment 100 is implemented as part of a cloud computing environment such as cloud computing environment 50 (FIG. 5).

User device 102 is configured to generate and transmit data to and/or from signal system 104. In some embodiments of the present invention, user device 102 is a disk device, a laptop computer, a tablet computer, a netbook computer, a personal computer (PC), a desktop computer, a personal digital assistant (PDA), a smart phone, an internet-of-things (IoT) enabled device, a VR/Augmented Reality (AR) display device, and/or other suitable programmable electronic devices capable of communicating with various components and devices within distributed environment 100. In some embodiments of the present invention, user device 102 comprises two or more separate devices. In some embodiments of the present invention, user device 102 is a programmable electronic mobile device or a combination of programmable electronic mobile devices capable of executing machine readable program instructions and communicating with other computing devices (not shown) within distributed environment 100. In some embodiments of the present invention, user device 102 may include internal and external hardware components, such as those depicted and described below with respect to FIG. 7.

In general, in some embodiments of the present invention, signal system 104 is configured to generate acoustic signatures of one or more users in a manner that is not only based on audio obtained from user(s), but further based on a context and state space that is generated for the user(s). In some embodiments of the present invention, signal system 104 is configured to execute a signal processing technique that includes generating a set of multiple signals representing a set of user criteria (e.g., via context processing component 108, state space processing component 110, and/or signal generation component 112). For example, in the context of a plurality of users, in some embodiments of the present invention, the set of multiple signals that are generated by signal system 104 includes a signal representing audio of all users, a signal representing context driven by natural language processing (NLP), and/or a signal representing available state space of all users (i.e., physical location). Signal system 104 is configured to combine the set of signals to generate an overall embedded sentiment signal (e.g., via signal generation component 112). The embedded sentiment signal is processed in the frequency domain by signal system 104 to create a unique acoustic signature for a single user and/or for a group of users, which may be output by signal system 104 (e.g., via speaker output component 114). In some embodiments of the present invention, signal system 104 is configured to derive the sentiments from user context and/or based on a combination of user contexts and context interaction with a user state space as identified by signal system 104.

In some embodiments of the present invention, signal system 104 is configured to output the acoustic embedded signal in the frequency domain via a speaker of signal system 104 (e.g., via speaker output component 114). In some embodiments of the present invention, signal system 104 is configured control an external device such as, for example, an appliance via on the outputted acoustic embedded signal in the frequency domain. For example, in some embodiments of the present invention, an example appliance includes a door lock, a lighting device, a thermostat, a security system, and/or other voice enabled or controllable device may be controlled via the outputted acoustic embedded signal. In some embodiments of the present invention, the outputted acoustic embedded signal includes audible speech that includes for example, a voice command that is utilized to control an external device (e.g., appliance). In some embodiments of the present invention, the acoustic embedded signal that is outputted by signal system 104 does not include audible speech but rather includes an audible signal that may be translated via signal processing into a predetermined command such as, for example, by outputting a noisy signal that is understood by an external device as being a predetermined command (e.g., lock door, turn off lights, set alarm, etc.).

In some embodiments of the present invention, signal system 104 is configured to obtain (e.g., extract) user context from one or more suitable sources (e.g., via context processing component 108). For example, one or more embodiments of the present invention includes, signal system 104 is configured to extract user context based on a combination of one or more of extracting user context via natural language processing, extracting user context from physiological conditions, and/or extracting user context based on location of one or more neighboring users.

In some embodiments of the present invention, in regards to extraction of user context via language processing, the extraction includes extracting conversation data from a monitored conversation of one or more users (e.g., user device 102), in which the mood of a user is ascertained based on NLP. In some embodiments of the present invention, the conversation is extracted from text data sent to and/or from a user device associated with or used by the user (e.g., user device 102). In some embodiments of the present invention, conversation data is extracted from audio analysis using a speech-to-text engine (e.g., audio data from a microphone of user device 102).

In some embodiments of the present invention, in regards to extraction of context from physiological condition, context is extracted by signal system 104 through a physical condition data that is obtained via of one or more sensors that are configured to extract physical condition data (e.g., heartrate sensor, temperature sensor, accelerometer, etc.). In some embodiments of the present invention, the one or more sensors are port of user device 102 and/or are connected to user device 102. In some embodiments of the present invention, the one or more sensor includes one or more wearable sensors. In some embodiments of the present invention, signal system 104 is configured to extract a user's tone, and/or pitch of voice from audio data of the user and configured to detect a current condition of the user based on the extract tone and/or pitch. In some embodiments of the present invention, signal system 104 is configured to identify a predetermined set of medical points as being associated with a certain sentiment (e.g., heartrate exceeding a predetermined threshold heartrate indicating an arrhythmia).

In some embodiments of the present invention, in regards to extraction based on location of neighbor users, the extraction includes extracting location data and/or relationship data associated with a first user and/or associated with one or more second users, in which the context of the first user is based on relative location and/or relationship to nearby second users (e.g., distance from the first user to at least one second user being less than a predetermined threshold distance). In some embodiments of the present invention, signal system 104 is configured to associate a relationship type of the first user to a particular second user and use the associated relationship type to detect an overall impact on the mood of the user (e.g., parent-child relationship). User context may change based on what is identified as the relationship between the first user and one or more second users that are within a predetermined distance of the first user.

In some embodiments of the present invention, signal system 104 is configured to identify a context interaction with a user state space, in which the state space is identified based on a user's location within a space and/or a user's location with respect to other users and/or objects. In some embodiments of the present invention, the user's state space is formed based on identifying a user's relative position in a predetermined space such as a home and/or office, identifying a distance of the user to different objects from the user's position and/or identifying the user's relative position/distance from other users in the vicinity. In some embodiments of the present invention, the user's location at a first room and a second room form two different state spaces, one for each location. In some embodiments of the present invention, the extraction of the distances from the user to different objects includes, for example, calculating a distance of the user to an appliance (e.g., television), which may impact a user's behavior. In some embodiments of the present invention, the distances are extracted by signal system 104 via the use of one or more sensors such as a camera, GPS, and other suitable position detection devices or sensors (e.g., via user device 102).

In some embodiments of the present invention, signal system 104 is configured to create a user context and state space for each user individually. In some embodiments of the present invention, a context state space is created for a combination of users based, at least in part, on different created user contexts and state spaces that interact with each other and create a context state space graph for the combination. For example, in some embodiments of the present invention, the user context of a first user influences the user context of one or more second user in the physical vicinity of the first user, which leads to a formulation of mutual contexts between two users (e.g., presence of a parent and child forms a context of parent-child). In some embodiments of the present invention, signal system 104 is configured to form a mutual state space for two or more users (e.g., context of parent-child may have multiple state space based on relative positions).

Figure 2:
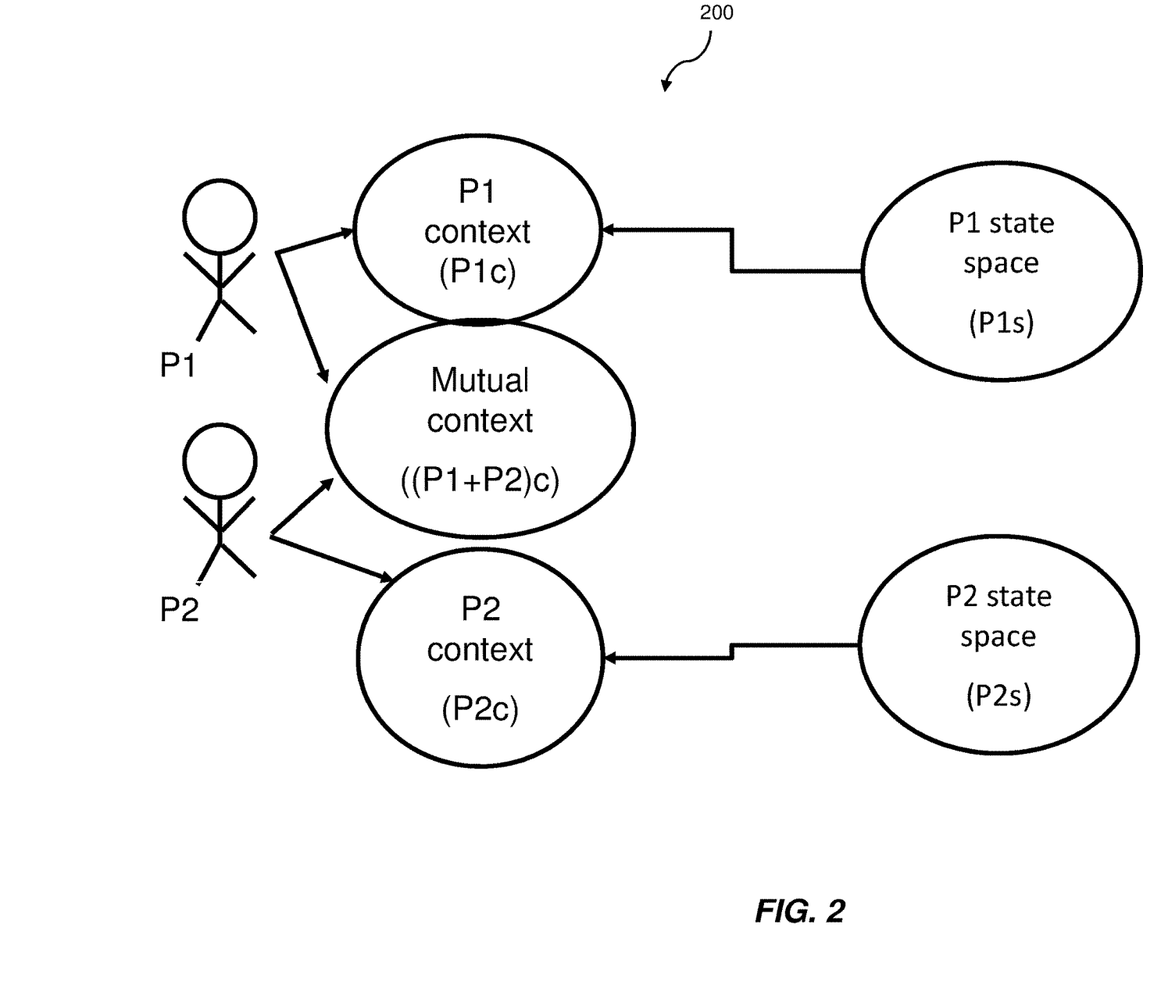
FIG. 2 depicts a block diagram of an example context and space graph for generating a sentiment vector in accordance with one or more embodiments of the present invention.
Figure 3:
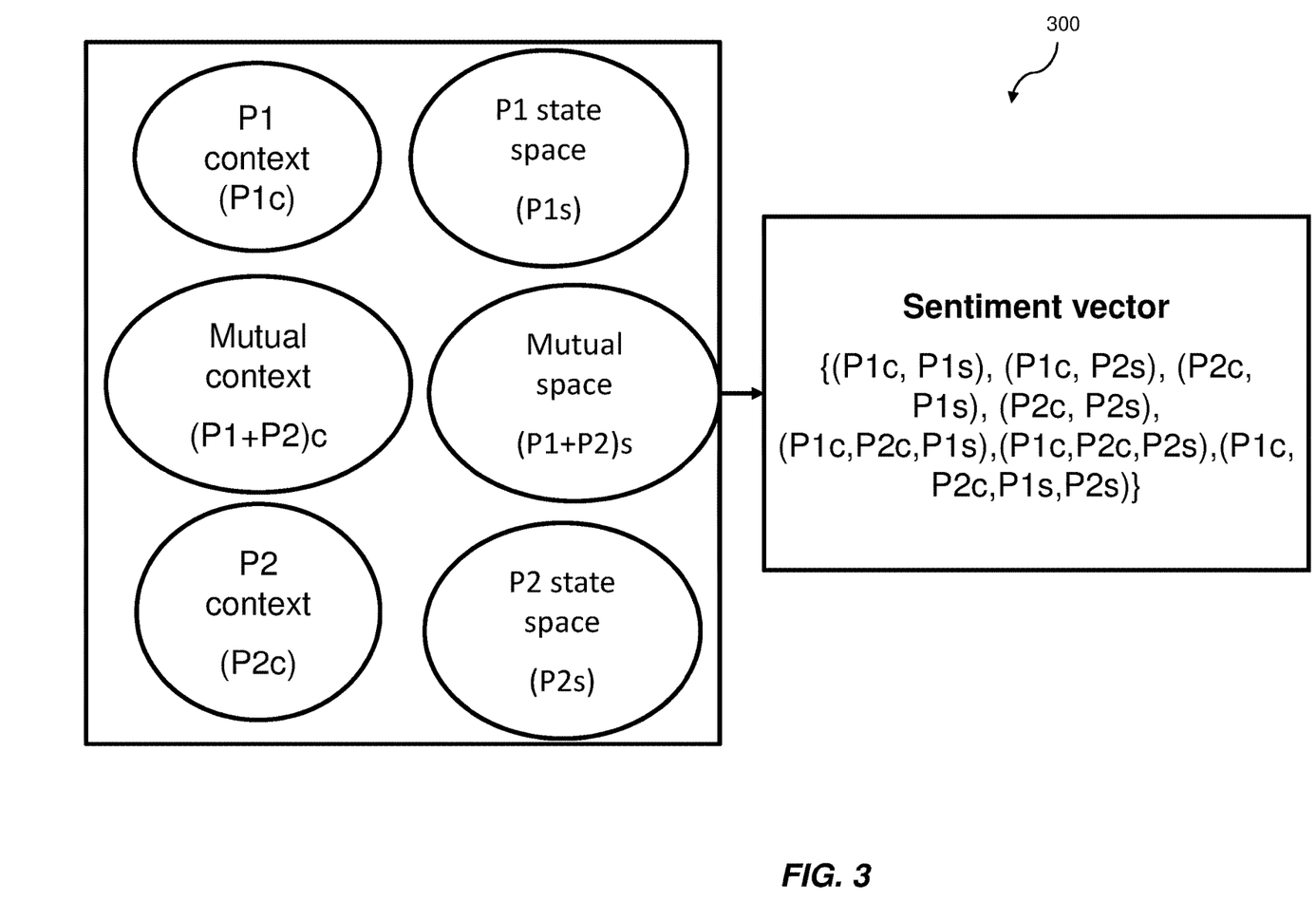
FIG. 3 depicts a block diagram of an example sentiment vector in accordance with one or more embodiments of the present invention.

In some embodiments of the present invention, signal system 104 is configured to create a sentiment vector representing all possible combinations of user contexts and available user state spaces for a single user or for a group of users. FIG. 2 illustrates an example formation of a context and space graph 200 for generating a sentiment vector. In some embodiments of the present invention, in the context of two users, a first user (P1) may be associated with a first user context (P1c) and with a first user state space (P1s). A second user (P2) may be associated with a second user context (P2c) and with a second user state space (P2s). A unique combination of a user context and state space is formed, which represents the overall context of a single user and/or a group of users. In some embodiments of the present invention, signal system 104 is configured to accumulate the sentiments into a sentiment vector such as, for example, sentiment vector 300 shown in FIG. 3. In the context of the example sentiment vector 300 shown in FIG. 3, sentiment vector 300 is formed based on a first user context (P1c), a first user state space (P1s), a second user context (P2c), a second user state space (P2s), a mutual context ((P1+P2)c), and a mutual state space ((P1+P2)s). Accordingly, in some embodiments of the present invention, an example sentiment vector of two users may be represented as {(P1c, P1s), (P1c, P2s), (P2c, P1s), (P2c, P2s), (P1c,P2c,P1s), (P1c,P2c,P2s), (P1c,P2c,P1s,P2s)}.

Once the accumulated sentiment vector is obtained, a signal system 104 is configured to generate a sentiment signal for a user based on a combination of the user context and state spaces as ascertained by a sentiment vector and on audio data of the user (e.g., via signal generation component 112). In some embodiments of the present invention, the signature generation includes assigning a different signal for the context and state space of each user, receiving audio signals from voices of the users, combining the audio signals with the created signals representing sentiment. For example, in some embodiments of the present invention, a first unique signal is assigned to P1c+P1s, a second unique signal is assigned to P1c+P2s, and a third unique signal is assigned to P2c+P2s. In the context of the example shown in FIG. 3, received audio of a first user (P1) is combined with the three generated signals to generate an embedded sentiment signal. The embedded sentiment signal is converted into the frequency domain to obtain a unique acoustic signature representing sentiment.

Figure 4:
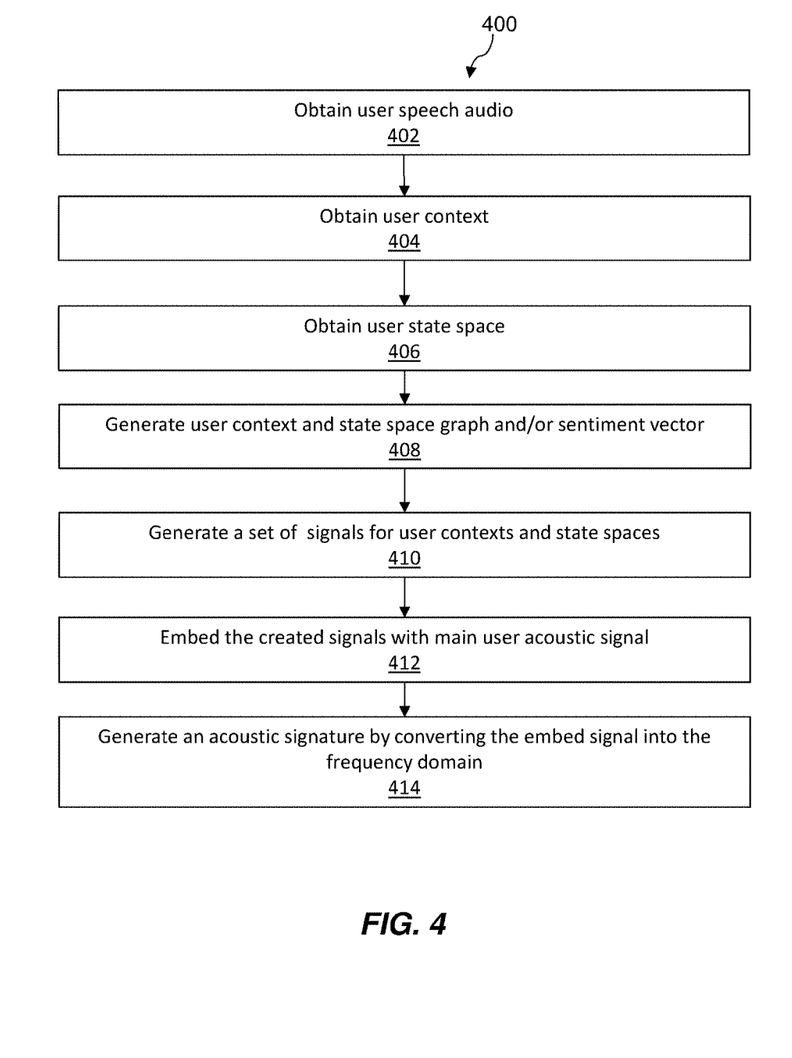
FIG. 4 depicts a flow diagram illustrating a methodology in accordance with one or more embodiments of the present invention.

Additional details of the operation of signal system 104 will now be described with reference to FIG. 4, wherein FIG. 4 depicts a flow diagram illustrating a methodology 400 executed by signal system 104 according to one or more embodiments of the present invention. At block 402, speech audio of at least one user is received (e.g., from user device 102). At block 404, user context is obtained (e.g., extracted via context processing component 108). At block 406, user state space is obtained (e.g., extracted via state space processing component 110). At block 408, user context and state space graph and/or sentiment vector is generated based on the obtained user context and obtained user state space. At block 410, a set of signals are generated for the user contexts and state spaces based on the generated graph and/or sentiment vector. At block 412, the set of signals are embedded with the speech audio of the first user to generate embedded sentiment signal. At block 414, the embedded signal is transformed into the frequency domain to generate an output acoustic signature representing sentiment. In some embodiments of the present invention, the output acoustic signature is outputted as audio via a speaker.

In some embodiments of the present invention, the obtaining of the user context includes extracting conversation data from a monitored conversation of the at least one user and applying natural language processing to the extracted conversation data. In some embodiments of the present invention, the obtaining of the user context of the at least one user further or alternatively includes extracting physiological condition data obtained from one or more sensors. In some embodiments of the present invention, the user context is of a first user and the obtaining of the user context of the at least one user further or alternatively includes identifying a relationship type between the first user and one or more second users located within a predetermined relative distance to the first user. In some embodiments of the present invention, the user context is of a group of users.

In some embodiments of the present invention, the user state space is of a first user, in which the obtaining of the user state space of the at least one user includes identifying a relative position of the first user within a predetermined space. In some embodiments of the present invention, the obtaining of the user state space of the at least one user further or alternatively includes identifying a distance of the first user to objects within the predetermined space. In some embodiments of the present invention, the obtaining of the user state space of the at least one user further or alternatively includes identifying relative positions of one or more second users within the predetermined space and identifying a relative position of the first user with respect to the one or more second users.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
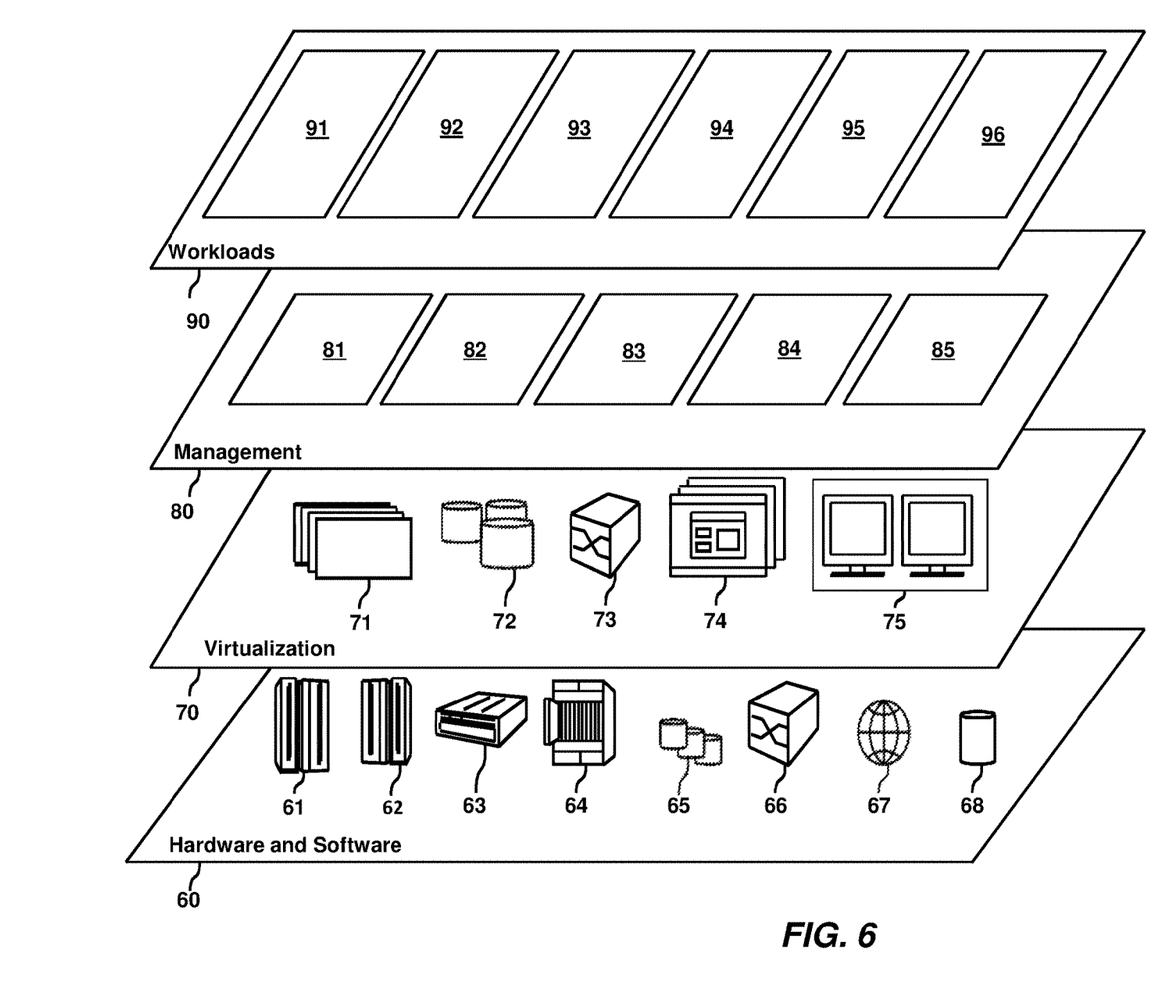
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fingerprint processing 96.

Figure 7:
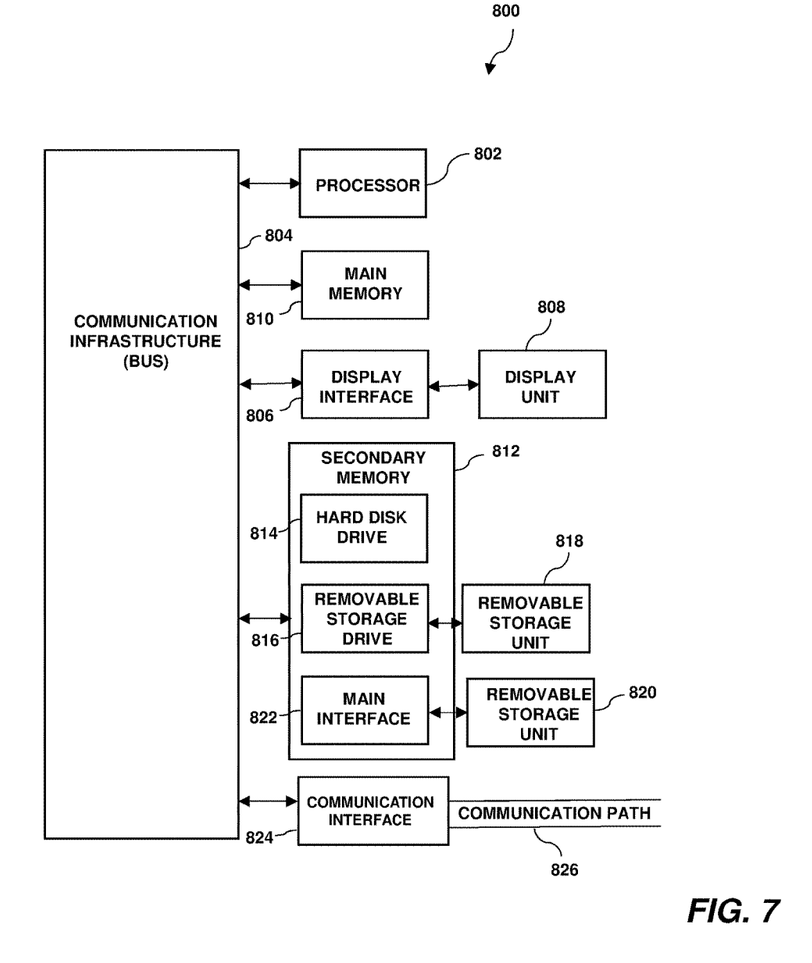
FIG. 7 depicts an exemplary computer system capable of implementing one or more embodiments of the present invention.

FIG. 7 illustrates a high-level block diagram showing an example of a computer-based system 700 that is useful for implementing one or more embodiments of the invention. Although one exemplary computer system 700 is shown, computer system 700 includes a communication path 726, which connects computer system 700 to additional systems and may include one or more wide area networks (WANs) and/or local area networks (LANs) such as the internet, intranet(s), and/or wireless communication network(s). Computer system 700 and additional systems are in communication via communication path 726, (e.g., to communicate data between them).

Computer system 700 includes one or more processors, such as processor 702. Processor 702 is connected to a communication infrastructure 704 (e.g., a communications bus, cross-over bar, or network). Computer system 700 can include a display interface 706 that forwards graphics, text, and other data from communication infrastructure 704 (or from a frame buffer not shown) for display on a display unit 708. Computer system 700 also includes a main memory 710, preferably random-access memory (RAM), and may also include a secondary memory 712. Secondary memory 712 may include, for example, a hard disk drive 714, solid state drive, and/or a removable storage drive 716, representing, for example, a floppy disk drive, a magnetic tape drive, or an optical disk drive. Removable storage drive 716 reads from and/or writes to a removable storage unit 718 in a manner well known to those having ordinary skill in the art. Removable storage unit 718 represents, for example, a floppy disk, a compact disc, a magnetic tape, or an optical disk, etc., which is read by and written to by a removable storage drive 716. As will be appreciated, removable storage unit 718 includes a computer readable medium having stored therein computer software and/or data.

In some alternative embodiments of the invention, secondary memory 712 may include other similar means for allowing computer programs or other instructions to be loaded into the computer system. Such means may include, for example, a removable storage unit 720 and an interface 722. Examples of such means may include a program package and package interface (such as that found in video game devices), a removable memory chip (such as an EPROM or PROM) and associated socket, and other removable storage units 720 and interfaces 722 which allow software and data to be transferred from the removable storage unit 720 to computer system 700.

Computer system 700 may also include a communications interface 724. Communications interface 724 allows software and data to be transferred between the computer system and external devices. Examples of communications interface 724 may include a modem, a network interface (such as an Ethernet card), a communications port, or a PCM-CIA slot and card, etc. Software and data transferred via communications interface 724 are in the form of signals which may be, for example, electronic, electromagnetic, optical, or other signals capable of being received by communications interface 724. These signals are provided to communications interface 724 via communication path (i.e., channel) 726. Communication path 726 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 710 and secondary memory 712, removable storage drive 716, and a hard disk installed in hard disk drive 714 and/or solid state drive. Computer programs (also called computer control logic) are stored in main memory 710, and/or secondary memory 712. Computer programs may also be received via communications interface 724. Such computer programs, when run, enable the computer system to perform the features of the present disclosure as discussed herein. In particular, the computer programs, when run, enable processor 702 to perform the features of the computer system. Accordingly, such computer programs represent controllers of the computer system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for acoustic signature generation via user sentiment embedding, the method comprising:
 receiving, by a system comprising one or more processors, user speech comprising an audio signal;
 obtaining, by the system, a user context for at least one user;
 obtaining, by the system, a user state space for the at least one user;
 generating, by the system, a sentiment vector based at least in part on the obtained user context and the obtained user state space;
 generating, a set of sentiment signals for the at least one user based on the sentiment vector;
 embedding the audio signal with the set of sentiment signals to generate an embedded sentiment signal; and
 generating the acoustic signature by converting the embedded sentiment signal into a frequency domain.

2. The computer-implemented method of claim 1, wherein the obtaining of the user context includes extracting conversation data from a monitored conversation of the at least one user and applying natural language processing to the extracted conversation data.

3. The computer-implemented method of claim 1, wherein the obtaining of the user context of the at least one user includes extracting physiological condition data obtained from one or more sensors.

4. The computer-implemented method of claim 1, wherein the user context is of a first user, wherein the obtaining of the user context of the at least one user includes identifying a relationship type between the first user and one or more second users located within a predetermined relative distance to the first user.

5. The computer-implemented method of claim 1, wherein the user state space is of a first user, wherein the obtaining of the user state space of the at least one user includes identifying a relative position of the first user within a predetermined space.

6. The computer-implemented method of claim 5, wherein the obtaining of the user state space of the at least one user further includes identifying a distance of the first user to objects within the predetermined space.

7. The computer-implemented method of claim 6, wherein the obtaining of the user state space of the at least one user further includes identifying relative positions of one or more second users within the predetermined space and identifying a relative position of the first user with respect to the one or more second users.

8. A system for acoustic signature generation via user sentiment embedding, the system comprising:
 a memory having computer readable instructions; and
 one or more processors for executing the computer readable instructions, the computer readable instructions controlling the one or more processors to perform operations comprising:
  receiving user speech comprising an audio signal;
  obtaining a user context for at least one user;
  obtaining a user state space for the at least one user;
  generating a sentiment vector based at least in part on the obtained user context and the obtained user state space;
  generating a set of sentiment signals for the at least one user based on the sentiment vector;
  embedding the audio signal with the set of sentiment signals to generate an embedded sentiment signal; and
  generating the acoustic signature by converting the embedded sentiment signal into a frequency domain.

9. The system of claim 8, wherein the operation of obtaining of the user context includes extracting conversation data from a monitored conversation of the at least one user and applying natural language processing to the extracted conversation data.

10. The system of claim 8, wherein the operation of obtaining of the user context of the at least one user includes extracting physiological condition data obtained from one or more sensors.

11. The system of claim 8, wherein the user context is of a first user, wherein the operation of obtaining of the user context of the at least one user includes identifying a relationship type between the first user and one or more second users located within a predetermined relative distance to the first user.

12. The system of claim 8, wherein the user state space is of a first user, wherein the operation of obtaining of the user state space of the at least one user includes identifying a relative position of the first user within a predetermined space.

13. The system of claim 12, wherein the operation of obtaining of the user state space of the at least one user further includes identifying a distance of the first user to objects within the predetermined space.

14. The system of claim 13, wherein the operation of obtaining of the user state space of the at least one user further includes identifying relative positions of one or more second users within the predetermined space and identifying a relative position of the first user with respect to the one or more second users.

15. A computer program product comprising a computer readable storage medium having program instructions embodied therewith for acoustic signature generation via user sentiment embedding, the program instructions executable by a system comprising one or more processors to cause the system to perform operations comprising:
 receiving user speech comprising an audio signal;
 obtaining a user context for at least one user;
 obtaining a user state space for the at least one user;
 generating, by the system, a sentiment vector based at least in part on the obtained user context and the obtained user state space;
 generating a set of sentiment signals for the at least one user based on the sentiment vector;
 embedding the audio signal with the set of sentiment signals to generate an embedded sentiment signal; and
 generating the acoustic signature by converting the embedded sentiment signal into a frequency domain.

16. The computer program product of claim 15, wherein the operation of obtaining of the user context includes extracting conversation data from a monitored conversation of the at least one user and applying natural language processing to the extracted conversation data.

17. The computer program product of claim 15, wherein the operation of obtaining of the user context of the at least one user includes extracting physiological condition data obtained from one or more sensors.

18. The computer program product of claim 15, wherein the user context is of a first user, wherein the operation of obtaining of the user context of the at least one user includes identifying a relationship type between the first user and one or more second users located within a predetermined relative distance to the first user.

19. The computer program product of claim 15, wherein the user state space is of a first user, wherein the operation of obtaining of the user state space of the at least one user includes identifying a relative position of the first user within a predetermined space.

20. The computer program product of claim 19, wherein the operation of obtaining of the user state space of the at least one user further includes identifying a distance of the first user to objects within the predetermined space, identifying relative positions of one or more second users within the predetermined space, and identifying a relative position of the first user with respect to the one or more second users.

* * * * *